United States Patent
Hashi et al.

(10) Patent No.: US 7,245,456 B2
(45) Date of Patent: Jul. 17, 2007

(54) HEAD SUPPORT DEVICE AND DISK DRIVE USING THE SAME

(75) Inventors: Hideyuki Hashi, Osaka (JP); Hideki Kuwajima, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 438 days.

(21) Appl. No.: 10/803,878

(22) Filed: Mar. 19, 2004

(65) Prior Publication Data

US 2004/0207958 A1    Oct. 21, 2004

(30) Foreign Application Priority Data

Mar. 20, 2003   (JP)   ............... 2003-078032

(51) Int. Cl.
  *G11B 5/48*   (2006.01)
  *G11B 21/21*  (2006.01)
(52) U.S. Cl. ................. 360/244.2; 360/245; 360/244.8
(58) Field of Classification Search ............ 360/244.2, 360/244.5, 244.8, 244.9, 245, 245.1, 245.3
  See application file for complete search history.

(56) References Cited

U.S. PATENT DOCUMENTS

| | | | | |
|---|---|---|---|---|
| 5,936,803 | A * | 8/1999 | Berding ................... | 360/244.8 |
| 6,778,362 | B1 * | 8/2004 | Davis et al. ............. | 360/244.8 |
| 6,826,018 | B2 * | 11/2004 | Kuwajima et al. ....... | 360/254.3 |
| 6,934,125 | B2 * | 8/2005 | Takagi et al. ............ | 360/244.8 |
| 7,035,054 | B2 * | 4/2006 | Honda et al. ............. | 360/265.9 |
| 7,068,469 | B2 * | 6/2006 | Kuwajima et al. ....... | 360/244.5 |
| 2002/0126419 | A1 * | 9/2002 | Kuwajima et al. ....... | 360/265.7 |
| 2002/0145822 | A1 * | 10/2002 | Kuwajima et al. ....... | 360/97.01 |
| 2003/0165032 | A1 * | 9/2003 | Miyamoto et al. ....... | 360/264.1 |
| 2004/0246624 | A1 * | 12/2004 | Hashi et al. ............. | 360/244.2 |

FOREIGN PATENT DOCUMENTS

| | | | |
|---|---|---|---|
| EP | 12844 | A1 * | 7/1980 |
| JP | 04313870 | A  * | 11/1992 |
| JP | 07211032 | A  * | 8/1995 |
| JP | 8-45214 | | 2/1996 |
| JP | 9-82052 | | 3/1997 |
| JP | 11-39629 | | 2/1999 |
| JP | 2002-260356 | | 9/2002 |

* cited by examiner

*Primary Examiner*—William J Klimowicz
(74) *Attorney, Agent, or Firm*—Wenderoth, Lind & Ponack, L.L.P.

(57) ABSTRACT

A head support device includes a slider with a head, a support arm having a leading end provided with the slider 1 via a flexure and being integral with, in the vicinity of its base end, a spring member along a centerline, and a base arm having two pivots contacting the support arm. The spring member is fixed to the base arm at its leading end and has a hole in its center and a slit part at its base end. The support arm includes, about its base end, a slit and a reinforcing plate also serving as a balancer. This head support device can be used in various information apparatuses including a magnetic recording/reproducing apparatus, a magneto-optical disk drive and an optical disk drive.

29 Claims, 9 Drawing Sheets

$\sigma_1 > \sigma_2$

Fig. 6

Conditions
of Spring Member

Material : SUS304
Young's Modulus = 176400MPA
Spring Member Thickness = 40 $\mu$ m
Spring Member Width b = 1.8mm
Distance from Vertex
 of Pivot End of Slider lc = 13mm
Deformed Spring
 Member Height $\delta$ = 0.1mm Ratio n of total area
of spring member
to area of part of
spring member
does not include hole —♦— n = 0.999
—■— n = 0.8
—▲— n = 0.4
—✕— n = 0.3
—✱— n = 0.1
—●— n = 0.005

PRIOR ART

Fig. 7

PRIOR ART

Fig. 8

HEAD SUPPORT DEVICE AND DISK DRIVE USING THE SAME

BACKGROUND OF THE INVENTION

1. Field of the Invention

The present invention relates to a head support device, which supports a head and moves the head to a target position above a data-bearing surface of a disk for positioning. The invention also relates to a disk drive with a floating head, such as a magnetic disk drive, an optical disk drive or a magneto-optical disk drive, which uses the head support device and finds use as a recording/reproducing apparatus in a computer or the like.

2. Background Art

A disk recording/reproducing apparatus (hereinafter referred to as "disk drive") such as a hard disk drive (HDD) uses a head to record and reproduce data on and from a data-bearing surface of a disk, which is a recording medium. The HDD is provided with a head support device, whereby the head is supported in floating condition at a specified distance from the data-bearing surface of the disk and moves radially above the disk. Including this structure, many structures have been proposed (refer to, for example, Japanese Patent Unexamined Publication No. 09-082052).

Figure 7:
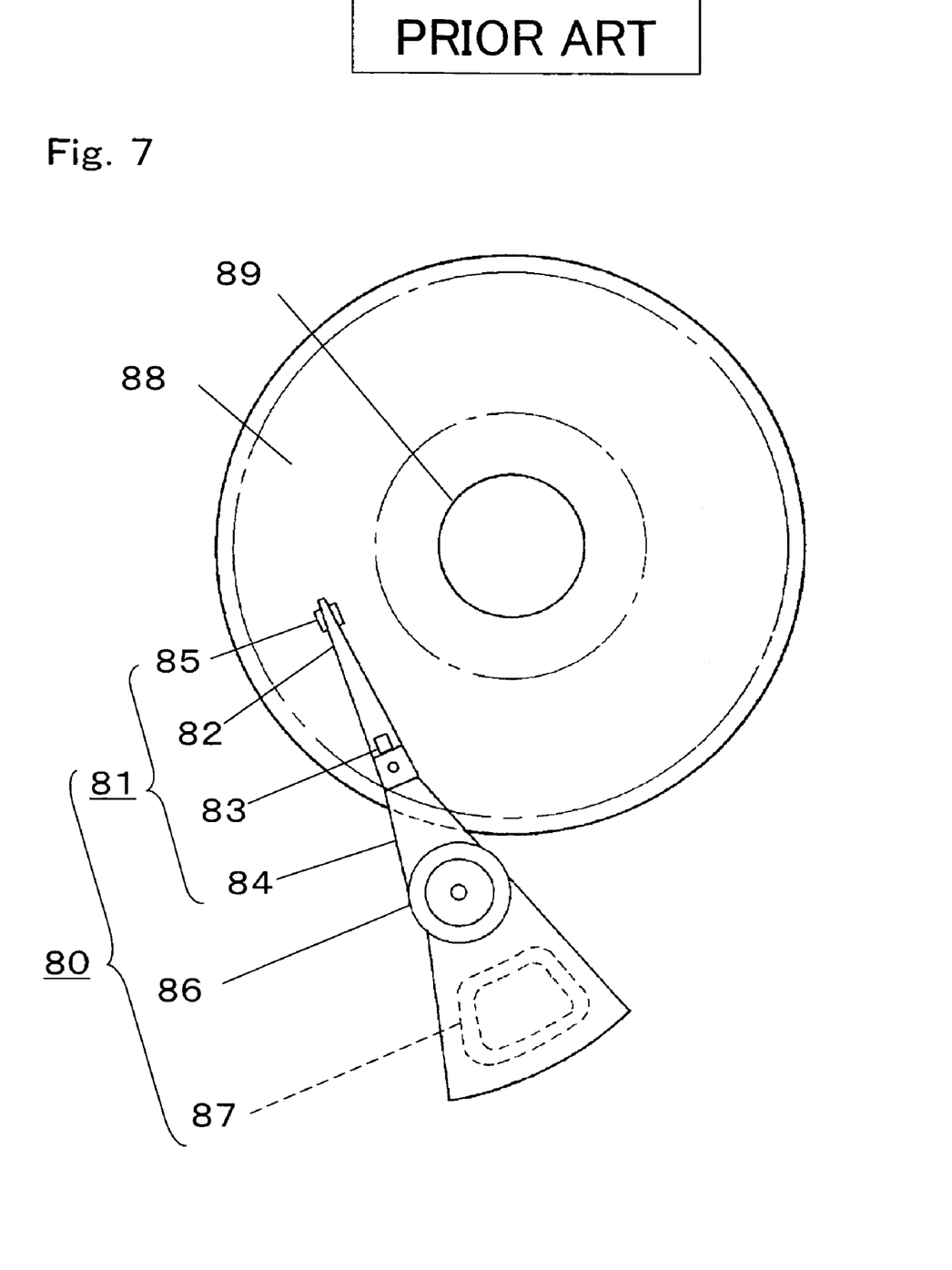
FIG. 7 is a plan view of an essential part of a conventional disk drive.
Figure 8:
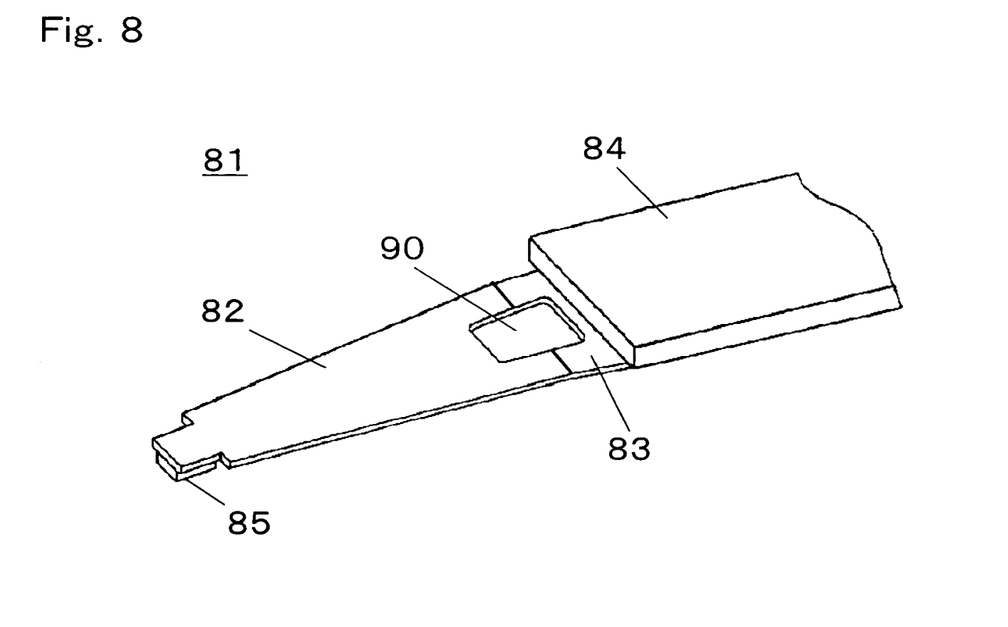
FIG. 8 is a perspective view illustrating the structure and action of a conventional head support device.

With reference to FIGS. 7 and 8, a head support device of a magnetic recording/reproducing apparatus such as the HDD is described hereinafter as an example of the head support device of the conventional disk drive with the floating head. FIG. 7 is a plan view of an essential part of the magnetic recording/reproducing apparatus, and FIG. 8 is a perspective view of the head support device.

In FIG. 7, head support device 81 is constructed of support arm 82 having relatively low rigidity, plate spring 83, base arm 84 having relatively high rigidity, slider 85 provided at one end of support arm 82 to face the disk, and a magnetic head (not shown) mounted to slider 85. Plate spring 83 is formed by folding the other end of support arm 82 and is connected to base arm 84. Base arm 84 is rotatably supported at rotary bearing 86. With driving means 87 mounted to base arm 84, head support device 81 can swing to a specified angle in a direction parallel to disk (also referred to as "magnetic recording medium" or simply "recording medium") 88. Head support device 81, rotary bearing 86 and driving means 87 form head driving device 80.

Disk 88 is rotated at a specified speed by rotation driving means 89. When the magnetic recording/reproducing apparatus records and reproduces, slider 85 floats by a given amount of flotation as a result of a balance between flotation, which is effected by an airflow caused by the rotation of disk 88, and force urging slider 85 toward disk 88. The head performs recording and reproduction while floating by the given amount. The force urging slider 85 toward disk 88 is applied mainly by plate spring 83 of head support device 81.

In other words, in recording and reproduction, head support device 81 is caused by driving means 87 provided at base arm 84 to swing on rotary bearing 86, and while floating by the given amount over disk 88, the head mounted to slider 85 is located above a specified track to perform recording and reproduction.

Referring to FIG. 8, a further description of the structure of head support device 81 and a description of the action of support device 81 are provided next. FIG. 8 is the perspective view of head support device 81 of FIG. 7 that is provided with the magnetic head.

In FIG. 8, slider 85 provided at the end of support arm 82 to face downward is provided with the magnetic head (not shown) at its surface facing the magnetic recording medium (not shown). Plate spring 83 is formed to have flexibility. Specifically, to reduce variations in load of slider 85 with respect to magnetic recording medium 88 that result from, for example, vertical movement (e.g., a wobble) of recording medium 88 or variations in the distance between slider 85 and recording medium 88 in mass production, plate spring 83 is provided with cutout hole 90, thus having reduced rigidity and a smaller spring constant.

In such a head support device, even when the disk moves vertically in recording and reproduction on and from the disk, the slider is caused to float stably, thus preventing off-tracking or deviation of the head from the specified track of the disk. Moreover, the force, which urges the specified load of the slider toward the disk, is applied mainly by the plate spring to allow the head to well follow the vertical movement of the disk. In this way, the support arm is formed to have the flexibility. Accordingly, the plate spring is required to secure, without fail, the force necessary for urging the slider toward the disk. It is also necessary that this urging force (also referred to as "thrust force") be prevented from varying as a result of variations in the amount of flotation of the slider in production. Providing the support arm with the cutout hole such as shown in FIG. 8 or forming the support arm into a thin plate structure reduces the rigidity as well as the spring constant, thus imparting some flexibility to the head support device for smoothing out the variations in the urging force.

It is also known that torsion of the support arm, for example, greatly affects the motion of the head support device. Japanese Patent Unexamined Publication No. 08-045214, for example, discloses a technique for reducing a torsional vibration mode or the like. According to such a technique, the curved shape of a spring section (which corresponds to the plate spring) is adjusted, and a bump (which corresponds to the magnitude of curvature of the spring section) and an offset (which corresponds to a difference in height between a junction of the support arm and the spring section and a junction of the spring section and the base arm) are optimized in order to allow the slider to remain almost motionless at a first torsional resonance frequency.

The above-mentioned head support devices including the one having the optimized bump and offset, each has the support arm formed into the thin plate structure and has a reduced frequency of a primary resonance point, that is, a reduced resonance frequency. When the head support device swings toward the specified track for positioning, a torsional vibration mode or the like occurs, and it takes time to settle this vibration mode. Consequently, it is difficult to reduce the access time. Although the advantage can be obtained at the first torsional resonance frequency, no advantage can be obtained at a higher-order torsional resonance frequency, whereby unstable motion is caused. Moreover, the need for various adjustments makes it difficult to reduce the number of man-hours required in production. For example, the variations in the distance between the support arm and the disk in production require the adjustment for each head support device, and in addition to the adjustment to the curved shape of the plate spring of the support arm for the purpose of suppressing the first torsional mode of the support arm, an adjustment is required, for stable performance, to suppress a characteristic change resulting from a change in setting height (Z-height) of the support arm. To solve these problems, a so-called balancing type head support device is proposed (refer to, for example, Japanese Patent Unexamined Publication No. 2002-260356).

Another proposal improves reliability by preventing a break in wiring. According to this proposal, the head signal wiring of a flexure is passed through an opening (through hole) of the support arm for placement without folding (refer to, for example, Japanese Patent Unexamined Publication No. 11-039629).

In the above-mentioned conventional head support devices, although providing the cutout hole or the thin plate structure reduces the rigidity and the spring constant of the plate spring, thus smoothing out the variations in the urging force, an ideal spring, for which stress on the spring that occurs in application of the load of the slider is reduced and pressing of the slider is increased, has not been designed.

Recently, the magnetic head is moved to the target track at increasingly high speed. Accordingly, the torsional vibration frequency of the torsional vibration mode becomes extremely higher, thus problematically causing the head to get off the target track.

With the balancing type head support device such as mentioned above, rigidity of the head signal wiring between the support arm and the base arm causes loss of a balance, thus adversely affecting impact resistance and stability of pressing force.

The proposal that the head signal wiring of the flexure is passed through the opening (through hole) of the support arm certainly allows the placement of the wiring without folding. However, in consideration of the work required for passage of the flexure through the hole, this proposal is hard to adopt in terms of mass production.

Since size reduction, especially thickness reduction, is demanded of the overall magnetic recording/reproducing apparatus, the head support device must be reduced in thickness.

Not only the magnetic recording/reproducing apparatus but also other disk drives, each having the floating head, such as the optical disk drive and the magneto-optical disk drive, have these problems.

SUMMARY OF THE INVENTION

The present invention addresses these problems and aims to provide a head support device, which is capable of reducing stress on a spring member of a support arm, has high flexibility while affording necessary and sufficient urging force to a head and has stable motion and excellent impact resistance, and a disk drive using the head support device.

To attain the above object, the head support device of the invention is arranged to support a read and/or write head for recording information on a recording medium and/or reproducing the information from the recording medium, the recording medium rotating around an axis of rotation of the recording medium, and the head support device includes:

a slider for mounting the head;

a support arm rotatable around a first axis, the first axis being parallel to the axis of rotation of the recording medium and located away from the axis of rotation;

a flexure for disposing the slider at a first end of the support arm;

a spring member for applying a specified thrust force to the head in a read position and/or a write position, the spring member having lower rigidity than the support arm; and a base arm rotatable around the first axis together with the support arm, the base arm being rotated by driving means and coupled to the support arm by the spring member, wherein the support arm supports the slider at the first end thereof and is pivotable around a second axis which is perpendicular to the first axis and extends through a pivot fulcrum provided for pivotally supporting the base arm relative to the support arm.

Another structure of the head support device is that the flexure is fixed to the support arm in the vicinity of the pivot fulcrum.

Another structure of the head support device of the invention is such that the support arm supports the slider at the first end thereof, includes a slit formed about a second end thereof and is pivotable around the second axis which is perpendicular to the first axis and extends through the pivot fulcrum, and the flexure passes through the slit to be disposed on the support arm and the base arm.

Still another structure of the head support device of the invention is such that the flexure is fixed to the support arm in the vicinity of the pivot fulcrum and between a midpoint of a distance from the first end of the support arm to the pivot fulcrum and a midpoint of a distance from the second end of the support arm to the pivot fulcrum.

Yet another structure of the head support device of the invention is such that the spring member includes a hole and a slit part.

A further structure of the head support device of the invention is such that the hole connects with the slit part.

A still further structure of the head support device of the invention is such that the hole is provided in a center of the spring member.

Another structure of the head support device of the invention is such that the hole is symmetric with respect to a centerline of the support arm.

Another structure of the head support device of the invention is such that the hole is shaped into one of a circle, an ellipse and a polygon.

Another structure of the head support device of the invention is such that the hole is shaped into a rhombus.

Another structure of the head support device of the invention is such that the slit of the support arm and the slit part of the spring member coincide with each other along the centerline at a junction between the support arm and the spring member.

Another structure of the head support device of the invention is such that the spring member is formed integrally with the support arm.

Another structure of the head support device of the invention is such that first, the flexure is fixed to the support arm in the vicinity of the pivot fulcrum, next, a part of the flexure that extends to a terminal is passed through the slit of the support arm to a back side of the support arm, and then a reinforcing plate is fixed.

Another structure of the head support device of the invention is such that the support arm includes a balancer for balancing the thrust force of the spring member about a bearing, and a resultant center of gravity of respective centers of gravity of the flexure provided with the slider, a pivot section of the support arm and the balancer acts in a direction passing through the second axis, which connects respective vertexes of the pivot fulcrum, toward the recording medium.

Another structure of the head support device of the invention is such that the slit part is symmetric with respect to the centerline of the support arm.

With each of these structures, the support arm can pivot against the resilient force of the spring member, and the slider can be pressed toward the magnetic recording medium by desired force and move flexibly to follow the motion of the surface of the rotating magnetic recording medium. The head support device obtained is reduced in weight and size as a result of having the hole in a flat part of the support arm, and its support arm can have resonance characteristics adjusted.

Since the flexure is fixed to the support arm in the vicinity of the pivot point (also referred to as "pivot fulcrum"), rigidity of the flexure does not adversely affect balancing performance of the head support device and the urging force (also referred to as "thrust force") of the spring member, thus not affecting the impact resistance and the pressing force acting on the slider.

Moreover, the stress on the spring member of the support arm can be reduced, so that with the necessary and sufficient urging force applied to the head, high flexibility can be secured, and the pressing force does not become unstable. The head support device thus has stability and excellent impact resistance and has a low-profile. Since the support arm is provided with the slit, the head support device not only affords excellent workability in assembly and lends itself easily to mass production, but also can be reduced in weight and size.

The disk drive of the present invention includes:

a recording medium;

rotation driving means for rotating the recording medium;

a read and/or write head for recording information on the recording medium rotating around an axis of rotation and/or reproducing the information from the recording medium;

a slider mounted with the head;

a support arm rotatable around a first axis, the first axis being parallel to the axis of rotation of the recording medium and located away from the axis of rotation of the recording medium;

a flexure for disposing the slider at a first end of the support arm;

a spring member for applying a specified thrust force to the head in a read position and/or a write position, the spring member having lower rigidity than the support arm; and a base arm rotatable around the first axis together with the support arm, the base arm being rotated by driving means and coupled to the support arm by the spring member, wherein the support arm supports the slider at the first end thereof and is pivotable around a second axis which is perpendicular to the first axis and extends through a pivot fulcrum provided for pivotally supporting the base arm relative to the support arm.

Another structure of the disk drive is such that the flexure is fixed to the support arm in the vicinity of the pivot fulcrum.

Another structure of the drive disk of the invention is such that the support arm supports the slider at the first end thereof, includes a slit formed about a second end thereof and is pivotable around the second axis which is perpendicular to the first axis and extends through the pivot fulcrum, and the flexure passes through the slit to be disposed on the support arm and the base arm.

Still another structure of the disk drive of the invention is such that the spring member includes a hole and a slit part.

With each of these structures, the magnetic head can be moved to a target track at high speed. The disk drive realized thus has substantially reduced access time and high reliability and is reduced in size and thickness.

DETAILED DESCRIPTION OF THE INVENTION

An exemplary embodiment of the present invention is described hereinafter with reference to the accompanying drawings.

Figure 1:
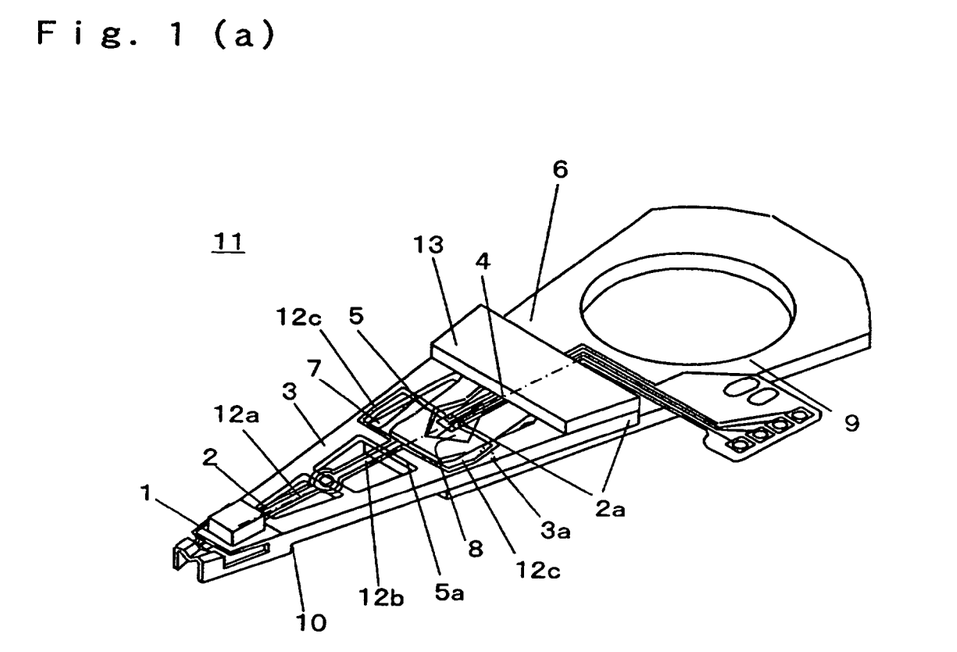
FIG. 1(a) is a perspective view illustrating a head support device in accordance with an exemplary embodiment of the present invention.
FIG. 1(b) is an assembly view in perspective of the head support device of FIG. 1(a) in accordance with the embodiment of the invention.
Figure 1B:
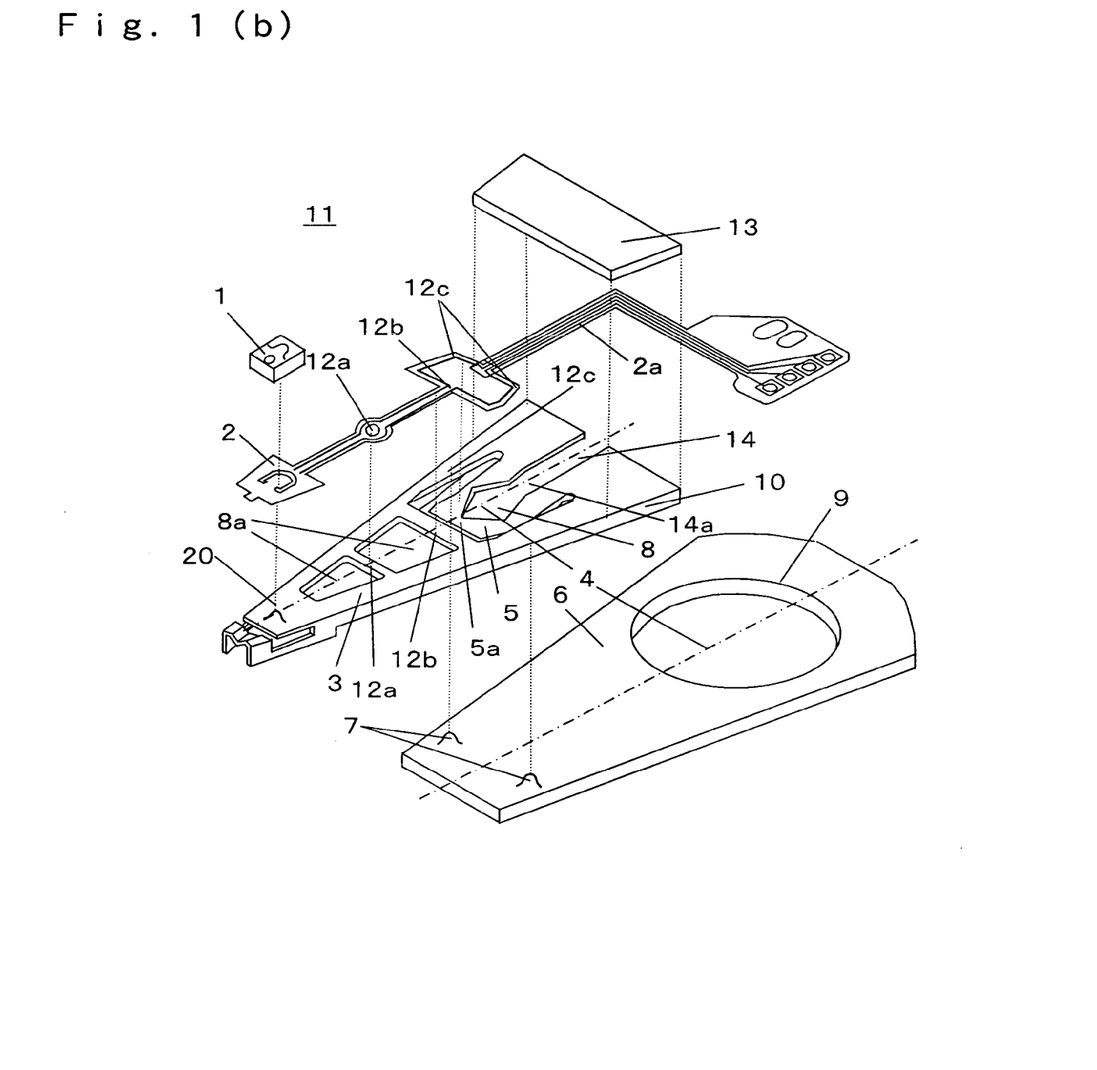
Figure 2:
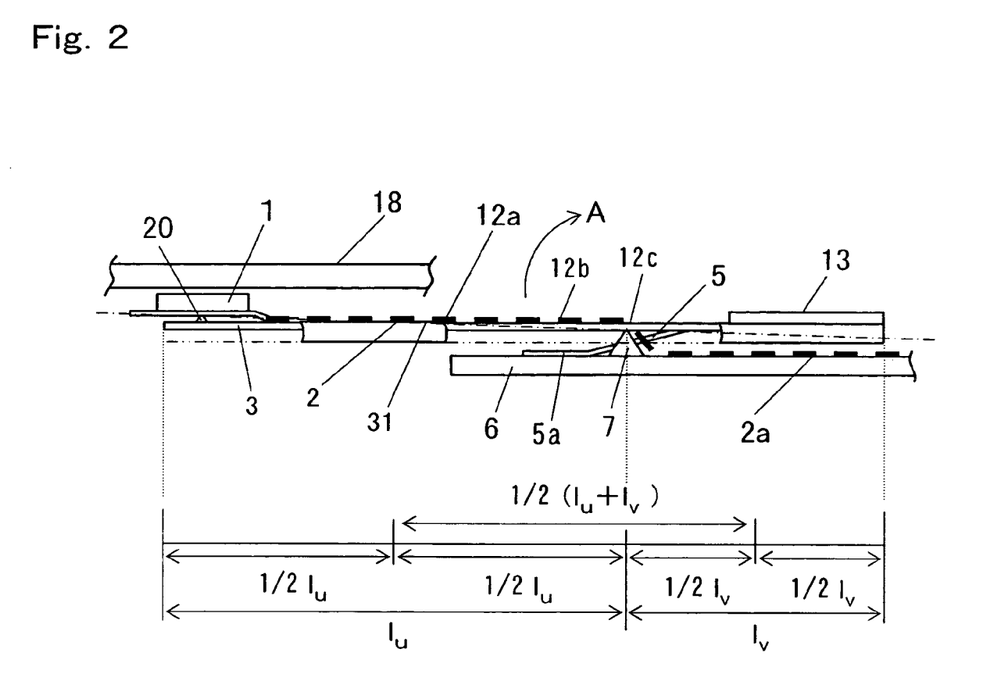
FIG. 2 is a partially sectional view illustrating a support arm of the head support device of FIG. 1(a) in accordance with the embodiment of the invention.

FIGS. 1(a), 1(b) and 2 illustrate a head support device 11 in accordance with the embodiment of the invention. The following description refers to a magnetic recording/reproducing apparatus as an example of a disk drive. FIG. 1(a) is a perspective view illustrating the head support device with a floating head for the disk drive used, for example, in a storage unit of a computer. FIG. 1(b) is an assembly view in perspective of the head support device of FIG. 1(a), and FIG. 2 is a partially sectional view illustrating a support arm of the head support device of FIG. 1(a).

In FIGS. 1(a), 1(b) and 2, a slider 1 mounted with the head (not shown) such as a magnetic head is fixed to a flexure 2. This flexure 2 has a so-called gimbal mechanism, which is an integration of, for example, a SUS metal sheet or flexure substrate and a flexible printed circuit (FPC) including head signal wiring. Flexure 2 is fixed to a support arm (also referred to as "suspension") 3 at a first junction 12a close to slider 1. A vertex of a dimple 20 (not shown in FIG. 1(a)) provided at support arm 3 contacts flexure 2, whereby slider 1 fixed to flexure 2 wobbles freely about the vertex of dimple 20. Since dimple 20 of support arm 3 supports slider 1 at its vertex via flexure 2, slider 1 can move flexibly to follow the motion of the surface of a rotating magnetic recording medium 18 (which is not shown in FIGS. 1(a) and 1(b) and hereinafter referred to as simply "recording medium 18"). Longitudinal centerline 4 of support arm 3 passes through a rotation center corresponding to a first axis. Around the rotation center, support arm 3 rotates under the action of a voice coil (not shown), which is a driving means provided to, for example, a base arm 6. Instead of supporting slider 1 via flexure 2, the vertex of dimple 20 may be in direct contact with slider 1.

Support arm 3 is formed with a tongue-shaped plate spring or spring member 5 formed by cutting out a part of support arm 3 in the vicinity of longitudinal centerline 4. This spring member 5 is provided with a hole 8 and a slit part 14a and has a leading end fixed to base arm 6 at a junction 5a by a known method such as spot welding, ultrasonic welding or laser beam welding. Spring member 5 may be formed of a material different from that for support arm 3. In such a case, spring member 5 is fixed to support arm 3 at its base end and fixed to base arm 6 at its leading end by the above-mentioned known welding method. Support arm 3 has slit 14, which is formed along longitudinal centerline 4, about its base end opposite to its leading end provided with slider 1, and is formed integrally with spring member 5 with slit 14 of support arm 3 coinciding with slit part 14a of spring member 5 along centerline 4. In FIG. 1(b), slit 14 and slit part 14a are shown as being wide. However, slit 14 and slit part 14a are not limited to those shown in FIG. 1(b) and may each be formed into a line hardly having a cutting width. In the above description, slit 14 is formed to be parallel to centerline 4 of support arm 3 and symmetric with respect to this centerline 4. However, this slit 14 may not be parallel to centerline 4 and symmetric with respect to centerline 4, provided that end section 2a formed of only the FPC of flexure 2 can be passed from a side of support arm 3 that is provided with slider 1 through slit 14 to a side of arm 3 that faces base arm 6.

Base arm 6 is provided with two pivots 7 symmetric with respect to longitudinal centerline 4 of support arm 3. These pivots 7 contact support arm 3 at their respective vertexes, so that support arm 3 pivots on the vertexes of these pivots 7 of base arm 6 against a resilient force of spring member 5 fixed to base arm 6. Slider 1 coupled to support arm 3 is urged toward recording medium 18 so as to be pressed in the direction of recording medium 18.

Support arm 3 has a reinforcing plate 13 fixed to its base end (opposite to its leading end provided with slider 1). This reinforcing plate 13 strengthens support arm 3 and also serves as a balancer. In fixing this reinforcing plate 13 to support arm 3, the following procedure is used. First, flexure 2, which is integrally formed of, for example, the SUS or stainless flexure substrate or sheet having some rigidity and the FPC including the head signal wiring, is fixed to support arm 3 at first junction 12a, a second junction 12b and two third junctions 12c, which are substantially symmetric with respect to centerline 4 in the vicinity of pivot points defined by respective pivots 7. Next, an end section 2a of flexure 2 is passed through slit part 14a of spring member 5 as well as slit 14, which is formed about the base end of support arm 3, and is disposed on the back side of support arm 3. Then reinforcing plate 13 also serving as the balancer is fixed by a known method such as laser beam welding. It is to be noted here that end section 2a, which extends from third junctions 12c of flexure 2 to a terminal, is formed of only the FPC, not having the SUS flexure substrate or sheet, and is thus narrow. In this structure, as shown in FIG. 2 indicating flexure 2 formed of the flexure substrate and the FPC with a bold broken line, end section 2a formed of only the FPC for the head signal wiring dissociates from the flexure substrate at points (corresponding to respective third junctions 12c) in the vicinity of pivots 7 serving as the pivot points of support arm 3. Thus, the rigidity of the SUS flexure substrate or sheet of flexure 2 does not impair balancing performance of head support device 11 and the force of spring member 5 that presses in the direction of recording medium 18.

Reinforcing plate 13 also serving as the balancer is so provided that a resultant center of gravity of respective centers of gravity of reinforcing plate 13, a pivot section of support arm 3 and flexure 2 mounted with slider 1 acts in the direction of recording medium 18 and is on a plane, which includes a pivot axis corresponding to a second axis connecting the respective vertexes of two pivots 7 of base arm 6 and is perpendicular to recording medium 18. With such a reinforcing plate 13 provided, force which causes support arm 3 to pivot on the pivot axis connecting the vertexes of pivots 7 is not caused by external impact force or the like, so that slider 1 does not damage recording medium 18 as a result of collision against recording medium 18. For this reason, the disk drive equipped with head support device 11 has increased reliability. Moreover, assembling flexure 2 and support arm 3 does not require passing end section 2a of the FPC of flexure 2 through hole 8 of spring member 5. Since end section 2a of the FPC can be placed on the back side of support arm 3 through use of slit part 14a of spring member 5 and slit 14 of support arm 3, head support device 11 affords excellent workability and lends itself easily to mass production.

In FIG. 2, third junctions 12c of flexure 2 (also serving as the points where end section 2a dissociates from the flexure substrate) are provided in the vicinity of the respective vertexes of pivots 7 serving as the pivot points of support arm 3. However, the present invention is not limited to this structure. Third junctions 12c may be provided between a point where the base end of spring member 5 is fixed to support arm 3 and a point where the leading end of this member 5 is fixed to base arm 6. Specifically, when $l_u$ and $l_v$ are a distance measured from pivot 7 to slider 1 along centerline 4 perpendicular to the pivot axis connecting pivots 7 and a distance measured from pivot 7 to balancer 13 along centerline 4, respectively, third junctions 12c of flexure 2 may be provided roughly in an area indicated by $1/2(l_u+l_v)$ in FIG. 2. However, it is preferable that these junctions 12c are provided in the vicinity of the respective vertexes of pivots 7 serving as the pivot points of support arm 3.

Figure 3A:
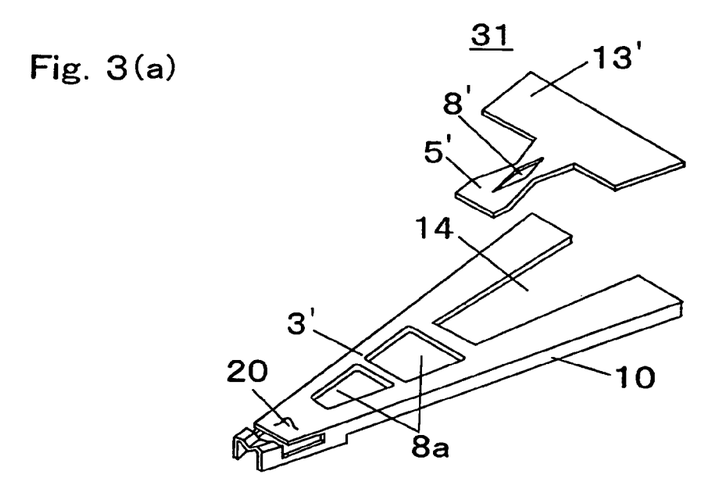
FIG. 3(a) is a perspective view of essential elements of another head support device in accordance with the embodiment of the invention.
Figure 3B:
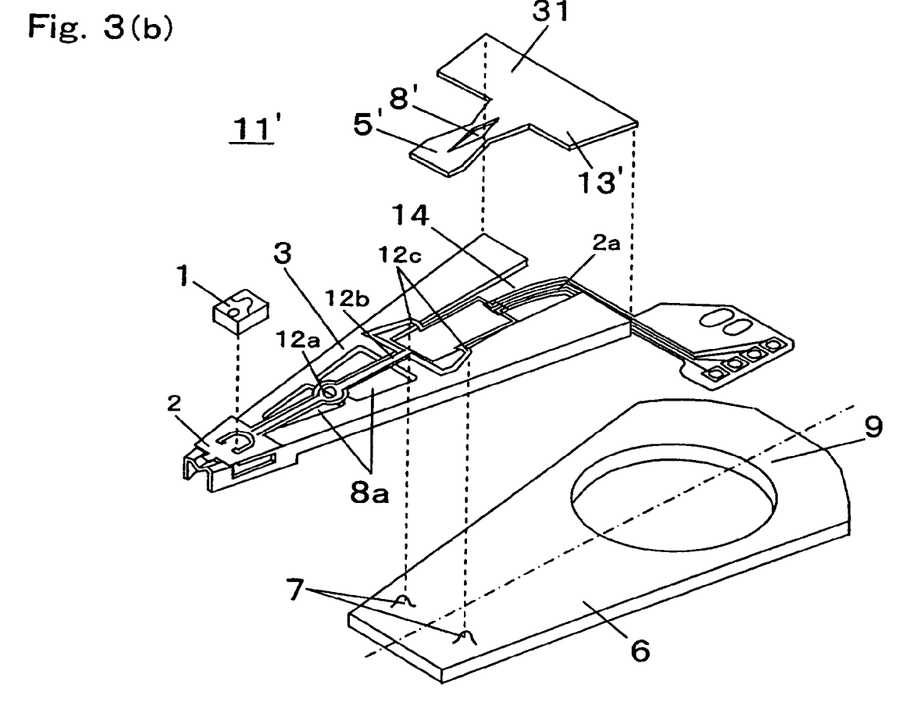
FIG. 3(b) is an assembly view in perspective of the head support device using the support arm of FIG. 3(a) in accordance with the embodiment of the invention.

The present embodiment's head support device 11, which includes slider 1, flexure 2, support arm 3, spring member 5 and base arm 6, can have a structure different from the one described above. For example, the structure such as shown in FIGS. 3(a) and 3(b) is conceivable. In this structure of a head support device 11', support arm 3' has, as shown in FIG. 3(a), a large slit 14 at its base end opposite to its leading end provided with slider 1 (not shown in FIG. 3(a)), and integrated member 31 integrally formed of a reinforcing plate 13' and a spring member 5' is used in assembling head support device 11', as shown in FIG. 3(b). In assembly, first, end section 2a, which is formed of only the FPC and extends from third junctions 12c to the terminal, is passed through slit 14. Next, spring member 5' is passed through slit 14. Then support arm 3', integrated member 31 and base arm 6 are mounted at their respective junctions. In this way, the essential part of head support device 11' is assembled.

Base arm 6 is formed with, at its base end, coupling part 9 where this arm 6 will be integrated with a bearing (not shown) for rotation, that is, for allowing slider 1 mounted with the head to move above recording medium 18.

In the manner described above, end section 2a of the FPC may be disposed on the back side of support arm 3'.

When spring member 5 having hole 8 and slit part 14a is formed by cutting out the part of support arm 3 in the vicinity of longitudinal centerline 4 so that this member 5 becomes symmetric with respect to centerline 4 as shown in FIGS. 1(a) and 1(b), left and right portions of the top side of support arm 3 become continuous substantially throughout their respective entire lengths. Accordingly, side-reinforcing members 10 can be formed by bending these left and right portions substantially along their respective entire lengths. Providing support arm 3 with side-reinforcing members 10 can increase rigidity of support arm 3 remarkably and increase a resonance frequency of a torsional mode of support arm 3 from about conventional 2 kHz to about 10 kHz, thereby allowing head support device 11 to have an extremely high rotating speed and hence an extremely high access speed.

Base arm 6 is coupled to the bearing at coupling part 9 to allow support arm 3 mounted with slider 1 to rotate in a direction of the radius of recording medium 18. Facing base arm 6 across the bearing (not shown in FIGS. 1(a)-2), a driving means such as a voice coil motor or a linear motor is formed. The respective lengths of support arm 3 and base arm 6 of head support device 11 can be changed in accordance with the size of recording medium 18, so that head support device 11 has a standard structure applicable to the magnetic recording/reproducing apparatus having recording media 18 of different sizes or types.

The urging force (also referred to as "thrust force") which presses slider 1 toward recording medium 18 (not shown in FIGS. 3(a) and 3(b)) can be set arbitrarily by the choice of material or thickness of spring member 5, 5', the height of each pivot 7, or the position of the junction between support arm 3, 3' and spring member 5, 5'. For example, using a thick spring member 5, 5' made of highly rigid material allows application of greater urging force. Even increasing the height of each pivot 7 allows application of greater urging force. Changing the shape of spring member 5, 5' can reduce stress caused on spring member 5, 5' by the urging force. The present embodiment is designed to have rhombus-shaped hole 8, 8' and, in FIGS. 1(a)-2, elongated slit part 14a along centerline 4 for reducing the stress on spring member 5, 5'.

Figure 4A:
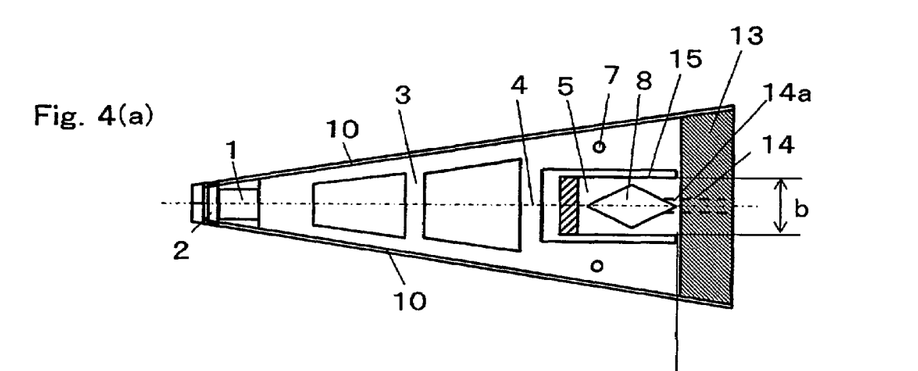
FIG. 4(a) is a plan view illustrating the support arm of the head support device of FIG. 1(a) in accordance with the embodiment of the invention.
Figure 4B:
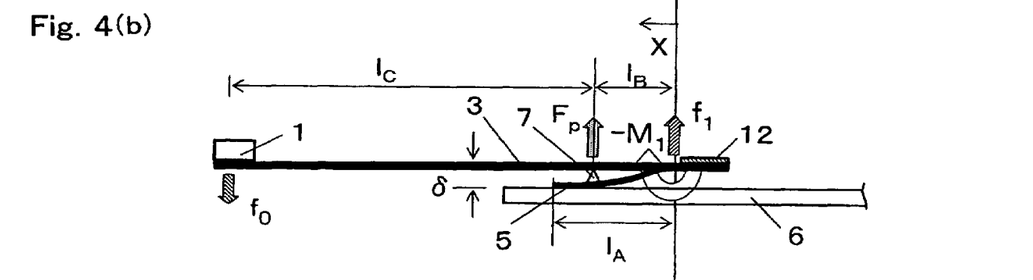
FIG. 4(b) is a sectional view taken along a centerline of the support arm of the head support device of FIG. 1(a) in accordance with the embodiment of the invention.
Figure 4C:
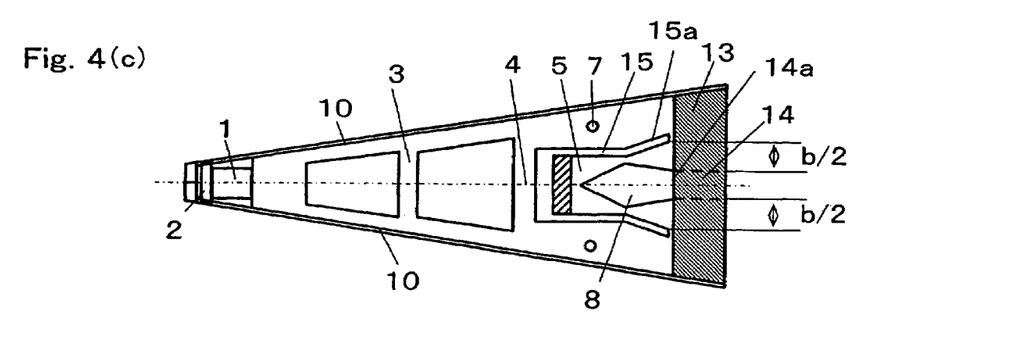
FIG. 4(c) is a plan view illustrating a support arm of still another head support device in accordance with the embodiment of the invention.

Referring to FIGS. 4(a)-5(b), a description is provided next of the stress on spring member 5 having hole 8 symmetric with respect to centerline 4. FIG. 4(a) is a plan view illustrating support arm 3 of head support device 11 shown in FIG. 1(b), and FIG. 4(b) is a sectional view taken along centerline 4, illustrating support arm 3 and spring member 5. In FIG. 4(b), load $f_0$ which acts on slider 1 when vertical force $f_1$ acts on spring member 5, pivot pressing force $F_P$ which acts on pivot 7, and counterclockwise moment $-M_1$ which acts on entire spring member 5 are schematically denoted by respective block arrows.

Figure 5A:
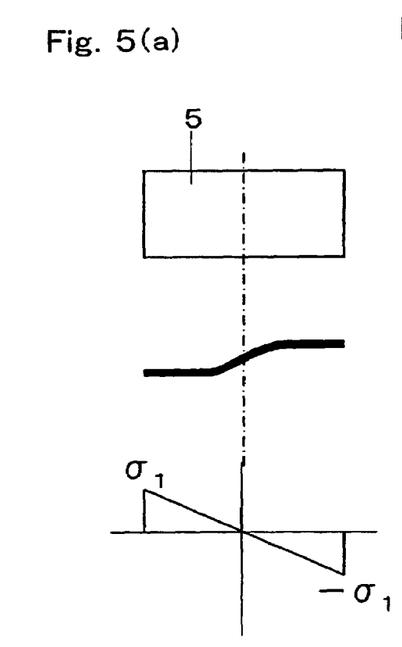
FIG. 5(a) illustrates stress on a spring member having no hole.
Figure 5B:
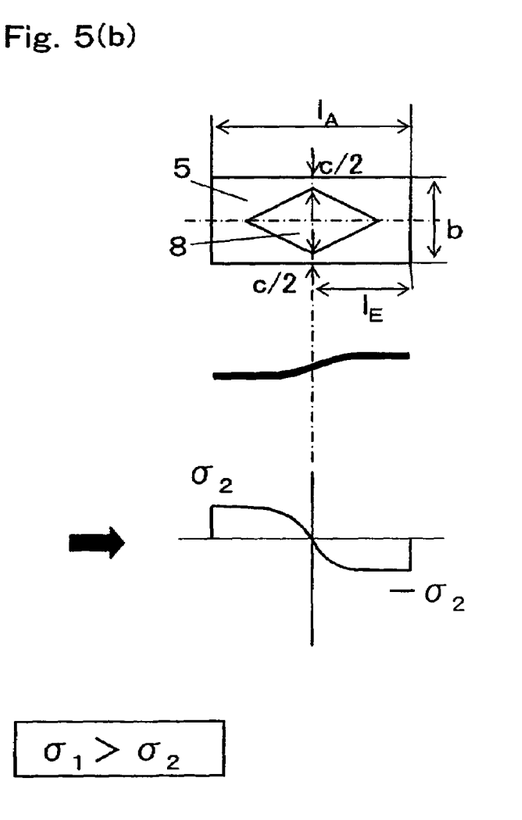
FIG. 5(b) illustrates stress on a spring member having a rhombus-shaped hole in its center.

FIG. 5(a) illustrates the stress on spring member 5 having no hole 8. In this case, distribution of the bending stress on spring member 5 is such that as shown in a lower section of FIG. 5(a), the bending stresses on the respective ends of member 5 become maximum ($\sigma_1$), while the bending stress on the center of member 5 becomes zero. For optimization of the ability of spring member 5 to cause the load, it is necessary that the stress be uniform. Forming rhombus-shaped hole 8 in the center of spring member 5 as shown in FIG. 5(b) provides such distribution of substantially uniform stress that the bending stress is $\sigma_2$ at each end of member 5 and gently reduces until it becomes zero at the center of member 5 as shown in a lower section of FIG. 5(b). Since $\sigma_1 > \sigma_2$, a spring constant of spring member 5 is presumably smaller than that of spring member 5 having no hole 8.

In the case of spring member 5 shown in FIG. 5(b), the stress distribution of spring member 5 can be expressed by the following equations (1) and (2) when calculated theoretically from strain energy and the shape of spring member 5.

When $0 < x \leq l_E$, $$\sigma = \frac{M}{I}\frac{h}{2} = \frac{6(-M_1 + f_1 x)}{bh^2\left(1 - \frac{1-n}{rl_A}x\right)} \quad (1)$$

When $l_E < x < l_A$, $$\sigma = \frac{M}{I}\frac{h}{2} = \frac{6(-M_1 + f_1 x)(r-1)l_A}{h^2\{(n-1)bx - nbl_A + brl_A\}} \quad (2)$$

In the equations, h denotes the thickness of spring member 5, I denotes a cross-sectional moment of inertia of a right end face of spring member 5, $f_0$ denotes the load on slider 1, n denotes a ratio of the total area of spring member 5 to the area of a part of spring member 5 that does not include rhombus-shaped hole 8 and is expressed as n=b/c, and r denotes a ratio of the distance between the end of sprig member 5 and the center of hole 8 to the length of spring member 5 and is expressed as $r = l_E / l_A$.

Spring constant K is expressed by the following equation (3).

$$K = \frac{1}{l_c^2}\left[\left(ml_A + \frac{A}{B}\right)\frac{B}{BC - DA}\left(ml_A + \frac{D}{B}\right) + \frac{1}{B}\right] \quad (3)$$

where $$A = \frac{l_A^2}{EI}\left[\frac{r^2(\log n - n + 1)}{(n-1)^2} + \frac{(r-1)}{(n-1)}\left\{r - 1 - \frac{(r-n)\log n}{(n-1)}\right\}\right]$$

$$B = \frac{l_A \log n}{EI(n-1)}$$

$$C = \frac{l_A^3}{2EI(n-1)^2}\left[r^3\left\{n - 3 + \frac{2\log n}{(n-1)}\right\} + \frac{(r-1)^3(1-n^2)}{n-1} + 4(r-n)(r-1)^2 - \frac{2(r-1)(r-n)^2}{(n-1)}\log n\right]$$

$$D = \frac{l_A^2}{2EI}\left[\frac{2r^2}{(n-1)^2}(\log n - n + 1) + (r-1)\left\{\frac{2(r-1)}{(n-1)} - \frac{2(r-n)}{(n-1)^2}\log n\right\}\right], \text{ and}$$

m denotes a ratio of the distance between the base end of spring member 5 and pivot 7 to the length of spring member 5 and is expressed as $m=l_B/l_A$.

Figure 6:
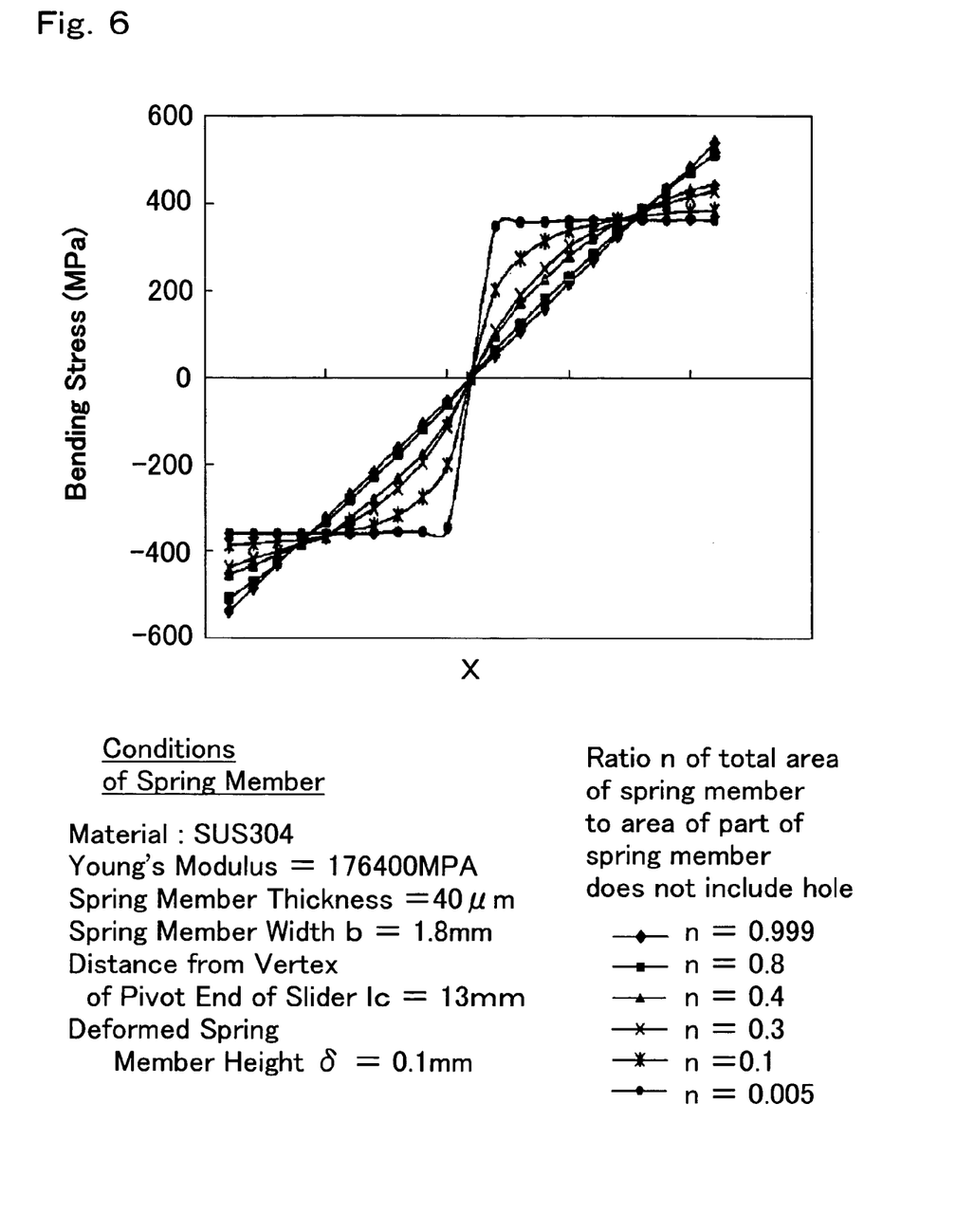
FIG. 6 illustrates stress distribution of the spring member with the rhombus-shaped hole in the head support device with respect to a ratio of the total area of the spring member to the area of a part of the spring member that does not include the hole, showing a result of numerical calculations in accordance with the embodiment of the invention.

FIG. 6 shows a result of actual numerical calculations using equations (1) and (2), illustrating the stress distribution of spring member 5, which is made of SUS304 and provided with rhombus-shaped hole 8, with respect to ratio n when spring member 5 has a thickness of 40 μm and a width of 1.8 mm, while $l_C$ is 13 mm. As is clear from this result, the smaller the value of ratio n, the less the stress on spring member 5, and the more uniform the stress distribution. Providing hole 8 in spring member 5 thus increases flexibility in design. Based on equation (3), the spring constant assumes a minimum value. This demonstrates that providing hole 8 in spring member 5 can reduce the spring constant. Providing hole 8 in spring member 5 also reduces the weight of spring member 5, whereby weight reduction of support arm 3 is achieved.

In the above description, the hole in the spring member of the support arm is symmetric, with ratio r of the distance between the end of the spring member and the center of the hole to the length of the spring member being 0.5. However, the present invention is not limited to this example, and the hole may be asymmetric. Even in cases where the spring member has the asymmetric hole, the stress on the spring member can be reduced, and although the stress distribution is not symmetric, the distribution can be made uniform about each end of the hole.

In the above description, the hole in the spring member of the support arm is rhombus-shaped. However, the present invention is not limited to this example, and the hole in the spring member may be shaped into, for example, a circle, an ellipse or a polygon. Even in cases where the spring member has the circular, elliptical or polygonal hole, the stress on the spring member can be reduced, and the stress distribution is uniform. It is to be noted however that even in these cases, the hole is preferably provided to be symmetric with respect to the centerline of the support arm.

For ease of understanding, the above theoretical description of the stress mentioned with reference to FIGS. 4(a)-5(b) has referred to the structure which differs from that of head support device 11 of the present embodiment in that support arm 3 and spring member 5 do not have slit 14 and elongated slit part 14a, respectively. In head support device 11 of the present embodiment, spring member 5 has elongated slit part 14a as indicated by dashed lines in FIG. 4(a). This slit part 14a connects with slit 14 of support arm 3, but is closed by reinforcing plate 13 fixed to also serve as the balancer, so that the assumption can be made that tongue-shaped spring member 5 has rhombus-shaped hole 8 such as shown in FIG. 5(b), and no complex equation is required. The reason is as follows. Even when slit part 14a is formed, forming end 15a of clearance 15 between support arm 3 and spring member 5 diagonally so that the distance between the end of hole 8 and end 15a of clearance 15 is b/2 as shown in FIG. 4(c) can secure two b/2-wide portions that face each other across longitudinal centerline 4 of support arm 3. Since the sum of the widths of these two portions is b, which is the same as width b of spring member 5 in FIG. 4(a), the same calculation result is obtained even with the invention's head support device having the structure illustrated by FIG. 4(c).

According to the present invention described above, the tongue-shaped plate spring or spring member provided with the hole and the slit part is formed by cutting out the part of the support arm in the vicinity of the longitudinal centerline of the support arm, so that the rigidity of the flexure does not adversely affect the balancing performance of the head support device and the spring member. Consequently, the head support device realized has excellent impact resistance, and its slider has excellent ability to follow. Mounting such a head support device improves head positioning control and allows the magnetic head to move to a target track at high speed, so that the disk drive realized has substantially reduced access time and is reduced in weight and size. The head support device of the invention can be used in a variety of information apparatuses including the magnetic recording/reproducing apparatus, a magneto-optical disk drive and an optical disk drive.

What is claimed is:

1. A head support device for supporting a read and/or write head for recording information on and/or reproducing information from a recording medium that rotates around an axis of rotation of the recording medium, said head support device comprising:
    a base arm adapted to be pivotable about a first axis that is parallel to and spaced apart from the axis of rotation of the recording medium;
    a support arm coupled to said base arm and adapted to be pivotable about the first axis together with said base arm;
    a flexure fixed to said support arm;
    a slider to which the head is to be mounted, said slider being mounted to said flexure at a first end of said support arm; and
    a spring member coupling said support arm to said base arm for applying a thrust force to the head via said support arm and said flexure;
    wherein a pivot fulcrum arrangement is provided to pivotally mount said support arm for pivoting about a second axis relative to said base arm, said second axis being perpendicular to said first axis; and
    wherein said flexure is fixed to said support arm between a midpoint of a distance from said first end of said support arm to said pivot fulcrum arrangement and a midpoint of a distance from a second end of said support arm to said pivot fulcrum arrangement.

2. The head support device of claim 1, wherein said flexure is fixed to said support arm in the vicinity of said pivot fulcrum arrangement.

3. The head support device of claim 1, wherein said spring member has lower rigidity than said support arm.

4. The head support device of claim 1, wherein said spring member has a hole and a slit part formed therein.

5. The head support device of claim 4, wherein said hole and said slit part of said spring member are connected to each other.

6. The head support device of claim 5, wherein said hole is symmetric with respect to a centerline of said support arm.

7. The head support device of claim 5, wherein said hole of said spring member is formed as one of a circle, an ellipse and a polygon.

8. The head support device of claim 5, wherein said hole of said spring member is formed as a rhombus.

9. The head support device of claim 5, wherein said spring member is formed integrally with said support arm.

10. The head support device of claim 5, wherein said slit part of said spring member is symmetric with respect to a centerline of said support arm.

11. The head support device of claim 4, wherein said hole is provided in a center of said spring member.

12. The head support device of claim 4, wherein said hole is symmetric with respect to a centerline of said support arm.

13. The head support device of claim 4, wherein said hole of said spring member is formed as one of a circle, an ellipse and a polygon.

14. The head support device of claim 4, wherein said hole of said spring member is formed as a rhombus.

15. The head support device of claim 4, wherein said spring member is formed integrally with said support arm.

16. The head support device of claim 4, wherein said slit part of said spring member is symmetric with respect to a centerline of said support arm.

17. The head support device of claim 1, wherein said support arm is provided with a balancer for balancing the thrust force of said spring member about a bearing; and
a resultant center of gravity of respective centers of gravity of said flexure provided with said slider, a pivot section of said support arm and said balancer acts in a direction passing through said second axis.

18. The head support device of claim 17, wherein said pivot fulcrum arrangement comprises a pair of pivot fulcrums; and
said second axis passes through vertexes of said pivot fulcrums.

19. A head support device for supporting a read and/or write head for recording information on and/or reproducing information from a recording medium that rotates around an axis of rotation of the recording medium, said head support device comprising:
a base arm adapted to be pivotable about a first axis that is parallel to and spaced apart from the axis of rotation of the recording medium;
a support arm coupled to said base arm and adapted to be pivotable about the first axis together with said base arm;
a flexure fixed to said support arm;
a slider to which the head is to be mounted, said slider being mounted to said flexure at a first end of said support arm; and
a spring member coupling said support arm to said base arm for applying a thrust force to the head via said support arm and said flexure;
wherein a pivot fulcrum arrangement is provided to pivotally mount said support arm for pivoting about a second axis relative to said base arm, said second axis being perpendicular to said first axis;
wherein said support arm has a slit formed therein at a second end thereof; and
wherein said flexure is supported on both said base arm and said support arm and passes through said slit of said support arm.

20. The head support device of claim 19, wherein said flexure is fixed to said support arm in the vicinity of said pivot fulcrum arrangement;
a terminal part of said flexure, which is adapted to extend to a terminal, passes through said slit in said support arm to a side of said support arm that faces said base arm; and
a reinforcing plate is fixed to a side of said support arm that is provided with said slider to strengthen said support arm.

21. The head support device of claim 19, wherein said spring member has a hole and a slit part formed therein.

22. The head support device of claim 19, wherein said support arm is provided with a balancer for balancing the thrust force of said spring member about a bearing; and
a resultant center of gravity of respective centers of gravity of said flexure provided with said slider, a pivot section of said support arm and said balancer acts in a direction passing through said second axis.

23. The head support device of claim 22, wherein said pivot fulcrum arrangement comprises a pair of pivot fulcrums; and
said second axis passes through vertexes of said pivot fulcrums.

24. The head support device of claim 19, wherein said spring member has lower rigidity than said support arm.

25. A disk drive comprising:
a recording medium;
rotation driving means for rotating said recording medium about an axis of rotation of the recording medium;
a read and/or write head for recording information on and/or reproducing information from said recording medium rotating around the axis of rotation of the recording medium;
a base arm mounted to be pivotable about a first axis that is parallel to and spaced apart from the axis of rotation of the recording medium;
a support arm coupled to said base arm and mounted to be pivotable about the first axis together with said base arm;
a flexure fixed to said support arm;
a slider to which the head is to be mounted; and
a spring member coupling said support arm to said base arm for applying a thrust force to said head via said support arm and said flexure, said spring member having lower rigidity than said support arm;

wherein a pivot fulcrum arrangement is provided to pivotally mount said support arm for pivoting about a second axis relative to said base arm, said second axis being perpendicular to said first axis; and wherein said flexure is fixed to said support arm between a midpoint of a distance from a first end of said support arm to said pivot fulcrum arrangement and a midpoint of a distance from a second end of said support arm to said pivot fulcrum arrangement.

26. The disk drive of claim 25, wherein
said flexure is fixed to said support arm in the vicinity of said pivot fulcrum arrangement.

27. The disk drive device of claim 25, wherein
said spring member has a hole and a slit part formed therein.

28. A disk drive comprising:

a recording medium;

rotation driving means for rotating said recording medium about an axis of rotation of the recording medium;

a read and/or write head for recording information on and/or reproducing information from said recording medium rotating around the axis of rotation of the recording medium;

a base arm mounted to be pivotable about a first axis that is parallel to and spaced apart from the axis of rotation of the recording medium;

a support arm coupled to said base arm and mounted to be pivotable about the first axis together with said base arm;

a flexure fixed to said support arm;

a slider to which the head is to be mounted; and a spring member coupling said support arm to said base arm for applying a thrust force to said head via said support arm and said flexure, said spring member having lower rigidity than said support arm;

wherein a pivot fulcrum arrangement is provided to pivotally mount said support arm for pivoting about a second axis relative to said base arm, said second axis being perpendicular to said first axis; and wherein said support arm has a slit formed therein at an end thereof; and wherein said flexure is supported on both said base arm and said support arm and passes through said slit of said support arm.

29. The disk drive device of claim 28, wherein
said spring member has a hole and a slit part formed therein.

* * * * *